United States Patent Office 3,314,909
Patented Apr. 18, 1967

3,314,909
CROSS-LINKING COPOLYMERS CONTAINING N-METHYLCARBAMYL RADICALS
Robert E. Whitfield, Pleasant Hill, and Howard L. Needles, Pinole, Calif., assignors to the United States of America as represented by the Secretary of Agriculture
No Drawing. Filed June 9, 1965, Ser. No. 462,761
19 Claims. (Cl. 260—29.6)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the preparation of cross-linked polymers. Further objects of the invention will be evident from the following description wherein parts and proportions are by weight unless otherwise specified.

In accordance with the invention, copolymers containing N-methylcarbamyl groups are cross-linked by reaction with a persulphate. In a typical embodiment of the invention, the starting material is a copolymer of N,N-dimethylacrylamide and acrylamide, this copolymer being essentially linear and soluble in polar solvents such as water, ethanol, acetic acid, etc. This copolymer is dissolved in water, a persulphate is added, and the system is heated. There is formed a cross-linked polymer which is insoluble in polar solvents, including those listed above. The reactions which take place are believed to include the following: In a first stage, an N-methyl group in one copolymer chain is oxidized to an N-methylol group which then, in a second stage, condenses with an unsubstituted amide group in another chain, forming a methylene bridge between the two chains. The transformation may thus be illustrated as in the following formulas, wherein A and B are each a copolymer chain, the active site in chain A being considered as a unit derived from N,N-dimethylacrylamide and the active site in chain B being considered as a unit derived from acrylamide:

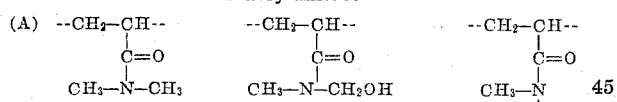
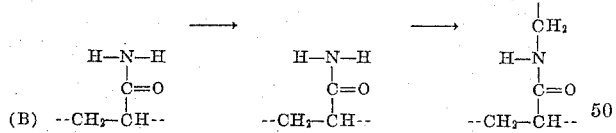

It is not maintained that the above-described reactions are the only ones which take place; undoubtedly others occur, for example, oxidation and condensation involving N-methylamide and unsubstituted amide groups on the same copolymer chain and cross-linking which involves more than one methyl group on a single N,N-dimethylcarbamyl unit and/or more than one hydrogen atom on an unsubstituted carbamyl unit.

The process of the invention is by no means limited to the above illustrative example but may be applied for cross-linking a wide variety of copolymers as explained in detail below.

The copolymers used as starting materials in the process of the invention are essentially-linear addition copolymers of at least two copolymerizable ethylenically unsaturated monomers, herein designated as A and B. A critical requirement of monomer A is that it contain an N-methylcarbamyl group, i.e.:

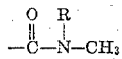

(R being hydrogen or an alkyl group such as methyl, ethyl, isopropyl, butyl, etc.).

While N,N-dimethylacrylamide and N-methylacrylamide are preferred as monomer A, one may use other N-methyl substituted unsaturated carboxylic acid amides, for example, N-methyl-N-ethylacrylamide; N-methyl-N-isopropylacrylamide; N-methylmethacrylamide; N-methyl-N-isopropylmethacrylamide; N,N-dimethylmethacrylamide, N-methyl-α-ethylacrylamide; N,N-dimethyl-α-ethylacrylamide; N,N-dimethyl-α-chloroacrylamide; N-methylcrotonamide; N,N-dimethylcrotonamide; N-methyl derivatives of itaconic acid diamide, fumaric acid diamide, maleic acid diamide; and other N-methyl amides of alpha, beta ethylenically unsaturated carboxylic acids containing up to about 18 carbon atoms.

A critical requirement of monomer B is that it contain a group coreactive with the N-methylol group, formed in the first (oxidation) stage. Typically, this coreactive group may be an amide group ($-CONH_2$), an amine group may be an amide group ($-CONH_2$), an amine group ($-NH_2$), a hydroxyl group ($-OH$), a carboxyl group ($-COOH$), or an esterified carboxylic group. The nitrogen atoms of the amide and amine groups may be secondary atoms, i.e., they may have only one hydrogen atom attached thereto, but it is preferred that the nitrogen atoms be primary atoms because of the greater reactivity thereof.

The types of cross-linking which are believed to take place with the various kinds of coreactive groups are illustrated below (cross-linking with an amide group has been shown supra). In the following formulas, R represents a copolymer chain with attention directed to a pendant N,N-dimethylcarbamyl group thereon. The symbols R′, R″, R‴, and R″″ represent copolymer chains with attention directed, respectively, to a pendant amine group, hydroxyl group, carboxyl group, and esterified carboxylic group.

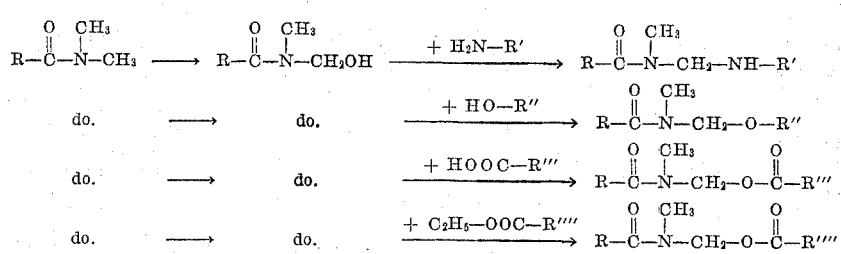

It may be noted that the last two reactions both lead to ester formation, the first of these by ordinary esterification, the second by replacement of the ethyl group (transesterification). As explained hereinabove in connection with the use of an unsubstituted amide group as a reactive site, the illustrated reactions are not intended to represent all the reactions which are involved in that such other reactions as intra-chain linking and formation of multiple cross-linking bridges at single reactive sites may also occur.

While acrylamide and methacrylamide are preferred for use as monomer B, other unsaturated carboxylic acid amides may be utilized to provide the desired coreactive amide group. Thus, other illustrative examples of amides for use as monomer B are ethacrylamide, crotonamide, maleic acid diamide, itaconic acid diamide, fumaric acid diamide, and other amides of alpha, beta ethylenically unsaturated carboxylic acids containing up to about 10 carbon atoms. If desired, one can utilize monomers which provide both an amide and a carboxylic function, for example, the half-amides of dibasic acids, typically, maleamic acid, fumaramic acid, itaconamic acids, and the like.

To provide an amine as the coreactive group, one may employ, as monomer B, compounds illustrated by the following: o-, m-, and p-aminostyrene; vinyl toluidines such as 2 - methyl - 3 - vinylaniline, and 2-methyl-4-vinylaniline; allyl amine; methallyl amine; 3-butenyl amine; 3-methyl-3-butenyl amines; 4-pentenyl amines; 4-methyl-4-pentenyl amines; 5-hexenyl amines; 5-methyl-5-hexenyl amines; 10-hendecenyl amines; vinyl benzyl amines; isopropenylbenzyl amines; vinylnaphthylmethyl amines; isopropenylnaphthylmethyl amines; vinylbiphenylmethyl amines; isopropenylbiphenylmethyl amines; 2-methyl-3-butenyl amine; 2,3 - dimethyl - 3 - butenyl amine; 2-phenyl - 3 - butenyl amine; 2 - phenyl - 3 - methyl - 3-butenyl amine; 2-tolyl-3-butenyl amine; 2-tolyl-3-methyl-3 - butenyl amine; 2 - methyl-4-pentenyl amine; 2-ethyl-4-methyl-4-pentenyl amine; 2-phenyl-4-pentenyl amine; 2-tolyl - 4 - methyl-4-pentenyl amine; allylbenzyl amines; methallylbenzyl amines; 2 - benzyl - 3 - butenyl amine; 2-benzyl-4-methyl-4-pentenyl amine; vinylcyclopentylmethyl amines; isopropenylcyclohexylmethyl amines; 2,2 - dimethyl-3-butenyl amine; $\beta$-aminoethyl vinyl ether; $\beta$-aminoethyl vinyl sulphide; $\beta$ - aminoethyl acrylate; $\beta$-aminoethyl methacrylate; and other polymerizable ethylenically unsaturated amines.

To provide hydroxyl as the coreactive group, one may employ, as monomer B, compounds illustrated by the following: Allyl alcohol; methallyl alcohol; allyl carbinol; methallyl carbinol; beta-propyl allyl alcohol; beta-ethyl allyl alcohol; methyl vinyl carbinol; ethyl vinyl carbinol; methyl allyl carbinol; 2(2,2-dimethylpropyl)-1-buten-4-ol; $\beta$-hydroxyethyl vinyl ether; $\beta$-hydroxypropyl vinyl ether; $\beta$ - hydroxyethyl vinyl sulphide; $\beta$ - hydroxyethyl acrylate; $\beta$-hydroxyethyl methacrylate; and other polymerizable ethylenically unsaturated alcohols.

As monomer B, in the category providing a carboxylic group as the coreactive group, one may use such compounds as acrylic acid, methacrylic acid, alpha-ethyl acrylic acid, itaconic acid, crotonic acid, maleic acid, fumaric acid, and other alpha, beta ethylenically unsaturated carboxylic acids containing up to about 12 carbon atoms. To provide esterified carboxylic group as the coreactive group, one may use as monomer B any of the above described acids esterified with ethyl, propyl, isopropyl butyl or other alkanols containing 2 to 18 carbon atoms. Typical illustrative examples are the ethyl, propyl, isopropyl, butyl, hexyl, octyl, decyl, dodecyl, hexadecyl, and octadecyl esters of acrylic, methacrylic, alpha-ethylacrylic, crotonic, maleic, itaconic, and fumaric acids. Monomers which provide both a carboxylic group and an esterified carboxylic group may obviously be used, as, for example, maleic, fumaric, or itaconic acid half-esterified with ethanol, butanol, or other alkanol.

The copolymers may be derived from one individual compound representing monomer A and another individual compound representing monomer B. However, this is not critical and the copolymers, in general, may be derived from one or more individual compounds representing monomer A and one or more individual compounds in the category of monomer B. Typical, for example, is a terpolymer of (A) N,N-dimethylacrylamide, (B) acrylamide, and (B') acrylic acid or ethyl acrylate.

The relative preparations of monomers A and B in the copolymer may be varied widely, for example, from 0.01 to 100 parts of monomer B per part of monomer A. Generally, for optimum results it is preferred that the proportion be 0.1 to 10 parts of monomer B per part of monomer A. For matters of economy, it is usually preferred that monomer A be the lesser component and taking this factor into account, the most preferred copolymers are those containing about 10 parts monomer B per part of monomer A.

It is not essential that the copolymer be derived exclusively from monomers A and B containing the desired coreactive groups. Thus, it is within the broad purview of the invention to utilize copolymers which additionally contain units derived from other monomers. In general, the additional component—herein designated as monomer C—may be any polymerizable ethylenically unsaturated monomer which is free from functional groups which would interfere with the reactive groups of monomers A and B. Representative compounds which can be used as monomer C are listed below by way of illustration but not limitation:

Olefinic hydrocarbons such as styrene, alpha-methyl styrene, alpha-ethyl styrene, alpha-butyl styrene, isobutylene, 2 - methyl-propene-1, 2 - methyl-butene-1, 2-methyl-pentene-1, 2,4-dimethyl-pentene-1, 2,3,3-trimethyl-butene-1, 2-methyl-heptene-1, 2,3-dimethyl-hexene-1, 2-methyl-octene-1, ethylene, propylene, butylene, butadiene, and the like.

Halogenated olefinic hydrocarbons such as alpha-chlorostyrene, alpha-bromostyrene, 2,5-dichlorostyrene, 2,5-dibromostyrene, o-, m-, and p-fluorostyrenes, 3,4-difluorostyrene, 2 - chloropropene, 2 - chlorobutene, 2-chloropentene, 2-fluorohexene, allyl chloride, vinyl chloride, vinylidene chloride, 1,2-difluoroethylene, monofluoroethylene, and the like.

Esters of ethylenically unsaturated alcohols such as vinyl acetate, vinyl propionate, vinyl butyrate, vinyl valerate, vinyl benzoate, vinyl p-chlorobenzoate, vinyl p-methoxybenzoate, isopropenyl acetate, isopropenyl propionate, isopropenyl butyrate, isopropenyl benzoate, isopropenyl p-chlorobenzoate, isopropenyl p-methoxybenzoate, isopropenyl chloroacetate, vinyl chloroacetate, vinyl alphachlorovalerate, allyl formate, allyl acetate, allyl butyrate, allyl caproate, allyl benzoate, allyl p-chlorobenzoate, allyl oleate, allyl p-methoxybenzoate, allyl chloroacetate, allyl thioacetate, and the like.

Nitriles such as acrylonitrile, methacrylonitrile, ethacrylonitrile, 3 - octenenitrile, crotonitrile, oleonitrile, cyanostyrene, and the like.

Ketones such as methyl vinyl ketone, ethyl vinyl ketone, isopropyl vinyl ketone, and other alkyl vinyl ketones.

Other compounds containing the characteristic $CH_2=C<$ grouping such as vinyl thiophene, vinyl pyridine, alkyl vinyl sulphones such as ethyl vinyl sulphone, vinyl ethers such as methyl, ethyl, butyl, benzyl, etc. vinyl ethers.

In general, the copolymer may contain from 0 to 2 parts of monomer C, taking the total of monomers A and B as one part. It is, of course, obvious that as the proportion of monomer C is increased, a dilution effect takes place which decreases opportunity for cross-linking and/or increases the distance between cross-links. Accordingly, if it is desired to prepare a highly cross-linked end product, it is preferred to omit monomer C or at most use a lesser proportion, for example, up to one part thereof per part of the total weight of monomers A and B.

The copolymers used as starting materials in the process of the invention may be prepared by copolymerizing a mixture of the selected monomers, utilizing conventional polymerization procedures, such as emulsification with a suitable emulsifier of a nonionic, anionic, or cationic type in conjunction with a free-radical initiator. Examples of the latter are azodiisobutyronitrile, t-butyl hydroperoxide, and ammonium or potassium persulphates. Redox systems such as combinations of persulphates and bisulphites, as well known in the art, may also be employed. The emulsifying agent is not a critical component and where a good dispersion of the monomers is attained, the emulsifier may be omitted. The copolymers may also be prepared by the conventional procedures of block and graft polymerization. For example, one or more, but not all, of the monomers are first polymerized and the product is copolymerized with one or more other monomers. Thus, acrylamide or N,N-dimethylacrylamide may first be homopolymerized or copolymerized with one or more, but less than all, of the comonomers to be introduced into the ultimate copolymer, and then the last monomer or monomers are added to the system and copolymerized or grafted onto the first homopolymer or copolymer formed. The same procedure may be used in reverse order to graft the acrylamide or N,N-dimethylacrylamide onto a previously formed homopolymer or copolymer of other monomeric units. Also, a plurality of monomeric units may be introduced in succession and the acrylamide or N,N-dimethylacrylamide may be introduced at the beginning, at the end, or at an intermediate stage as desired. Procedures of graft and block polymerization are especially useful to prepare copolymers containing units for which monomers do not exist as such, i.e., vinyl alcohol. Thus, for example, vinyl acetate may be homopolymerized, the product hydrolyzed to produce polyvinyl alcohol, and this product block or graft polymerized with N,N-dimethylacrylamide in polymer or monomer form, thereby yielding a polymer containing the desired N-methylamide and hydroxyl radicals.

The cross-linking process of the invention is relatively simple and involves heating of an aqueous dispersion containing the copolymer and a persulphate. The expression "dispersion" is used herein in a generic sense to include solutions, suspensions, and emulsions. Usually, the persulphate is ammonium, sodium, or potassium persulphate. However, the only critical requirement is that the persulphate anion be furnished and thus one can use any salt of persulphuric acid which is water-soluble and which forms the persulphate ion in water solution. The persulphate does not act in a catalytic capacity, hence catalytic amounts are not sufficient. The persulphate takes part in the reaction and one mole thereof is used up per mole of N-methylcarbamyl radical. Accordingly, to effect exhaustive cross-linking one would supply in the reaction system this stoichiometrical amount of persulphate. To effect an especially rapid cross-linking, one may use an excess of persulphate, for example, 2 moles thereof per mole of N-methylcarbamyl unit. On the other hand, where it is not desired to effect exhaustive cross-linking the amount of persulphate can be decreased. For example: Where the copolymer is of high molecular weight, formation of an insoluble cross-linked polymer product is attained with cross-linking taking place at only a fraction of the available sites. Taking the above factors into account, the amount of persulphate may be varied from about 0.1 to 2 moles per mole of N-methylcarbamyl unit. With regard to temperature, the cross-linking does not occur to any significant extent at room temperature, and it is necessary to heat the reaction system to at least 50° C. to achieve a useful rate of cross-linking. As the temperature is increased above 50° C., the rate increases markedly. Usually, temperatures above 100° C. are avoided as they would require a pressure vessel (to keep the water in the liquid state) and offer no special benefit. However, the cross-linking can be effected at any elevated temperature below that at which decomposition of the polymers occurs. In general, temperatures of about 70–80° C. are preferred as permitting use of open containers and as yielding cross-linking at a rapid rate. Also, to attain a rapid rate of cross-linking it is preferred that the amount of water and persulphate in the reaction be correlated so that the concentration of persulphate in the water in the system is about 1 to 5%. Where the starting copolymer is insoluble or poorly soluble in water, it is preferred to add a conventional emulsifier to the reaction system to enhance contact between the copolymer and the aqueous persulphate. For this purpose one may employ emulsifiers of the nonionic, cationic, or anionic types such as soaps, sodium lauryl sulphate, alkyl benzene sulphonates, lauryl pyridinium chloride, dihexyl sulphosuccinate, etc.

The fact that heat is required to effect cross-linking in the aqueous dispersion of copolymer and persulphate offers a special benefit that such dispersions can be prepared and held in the unreacted state until it is desired to effect the cross-linking, at which time heat is applied. For example, in conducting adhering and laminating procedures, the dispersion may be prepared and held for extended periods of time at room temperature without gelling (cross-linking). In other words, the dispersions exhibit a long pot-life. For use, the dispersion can then be applied to the objects to be adhered or laminated. Upon heating of these objects the cross-linking takes place and the desired adherence or laminating effect is attained. The long pot-life of the aqueous copolymerpersulphate dispersions may then be useful in treating fibrous materials. For example, a fibrous material may be impregnated with the dispersion at room temperature, using a conventional dip and pad technique, and thetreated material cured to cross-link the copolymer in situ on the fibers of the material. The curing may be done, for example, by heating the treated material in an oven at about 80°–150° C. or in a chamber filled with live steam for 5–30 minutes. The material may then be washed to remove unreacted materials and soluble reaction products, then dried and otherwise conventionally processed. The treatment may be applied to such fibrous materials as animal hides and leather; silk; animal hair, mohair; cotton; sisal; hemp; just; ramie; flax; wood; paper; synthetic cellulosic fibers such as viscose, cellulose acetate, cellulose acetatebutyrate, saponified cellulose acetate, cupra-ammonium rayons, ethyl cellulose; polyvinyl alcohol-protein fibers; align and pectin fibers; glass fibers; asbestos; organic noncellulosic fibers such as polyethyelne terephthalate, polyacrylonitrile, polyethylene, polypropylene, polyvinyl chloride, polyvinylidene chloride, nylon, polyurethanes; regenerated protein fibers such as those prepared from casein, soybeans, peanut protein, zein, gluten, egg albumin, collagen, or keratins such as animal hoof or horn; mixtures of any of the above such as textiles containing cellulosic and noncellulosic fibers, blends of synthetic fibers or cotton with wool, etc. The invention may be applied to such fibrous materials in any state such as bulk fibers, staple fibers, silvers, yarns, woven or knitted textiles, felts, fabricated articles such as garments and garment parts. The application of the invention may be for the purpose of obtaining any of a wide variety of functional or decorative effects such as sizing, increasing gloss or transparency, increasing water-, oil-, or soil-repellency, increasing adhesion or bonding characteristics of the substrates with rubber or other elastomers, imparting softness or lubricity, imparting shrinkage resistance, decreasing tendency to wrinkle, crease and pill during wear or during washing and drying operations, etc. In cases where the fibrous material is a hydrogen-donor (that is, where its molecules contain active hydrogen as in amine or hydroxy groups), it would be expected that during application of the process of the invention, a chemical combination of the polymer to the fiber molecules will take place. Typical examples of hydrogen-donor fibers are wool, cotton, and other natural cellulosic fibers, viscose, rayons, saponified cellulose acetate fibers, etc.

In addition to the applications described above, the cross-linked polymers of the invention are generally useful in the plastics, coating, adhesive, laminating, and other arts where resins are applicable. They are of particular utility for solution-thickening applications and in the formation of gels.

If for any reason it is desired to conduct the cross-linking at room temperature, one may add to the reaction system (aqueous dispersion of copolymer and persulphate) a substance which in combination with the persulphate forms a redox system. This technique, which forms a special modification of the invention, involves simply adding to the reaction system a compound such as an alkali-metal bisulphite, an alkali-metal sulphite or bisulphite; sulphur dioxide; sulphorous acid; a ferrous salt such as the ethylenediaminetetraacetate, sulphate, or acetate; a hydrazine salt such as hydrazine sulphate or chloride; silver nitrate; or other water-soluble substance which acts as a reducing agent and interacts with the persulphate to yield the desired free radicals. Where the reaction is conducted in the presence of such redox system, the cross-linking takes place virtually instantaneously on forming the dispersion even at room temperature.

The invention is further demonstrated by the following illustrative examples. In some of the runs—particularly Example I, part E and Example III—procedures outside the scope of the invention were included for purposes of comparison.

EXAMPLE I.—*Cross-linking of 1:10 N,N-dimethylacrylamide/acrylamide copolymer*

(A) *Preparation of copolymer.*—Nitrogen was passed through a solution of 1 g. of N,N-dimethylacrylamide, 10 g. of acrylamide, and 0.02 g. of ammonium persulfate in 100 ml. of water for 30 minutes to remove oxygen from the system. The solution was then heated at 60–70° C. for 30 minutes to yield a viscous colorless solution. Removal of water by evaporation at reduced pressure yielded a brittle polymer which was soluble in water and polar organic solvents such as ethanol, acetic acid, N,N-dimethylacetamide, and dimethylsulfoxide. Inherent viscosity of a 0.4% aqueous solution of this copolymer was 3.78 at 30° C. Analysis of the copolymer showed 18.2% nitrogen (calc. 19.3%). This copolymer was then used in the experiments described below.

(B) *Cross-linking with ammonium persulphate.*—To 1 g. of copolymer dissolved in 10 ml. of water was added 0.23 g. of ammonium persulfate. On heating at steam bath temperature for 30 minutes, the solution set to a thick gel. Removal of water by evaporation at reduced pressure yielded a brittle polymer which was insoluble in water and also insoluble in polar organic solvents such as ethanol, N,N-dimethylacetamide, acetic acid, and dimethylsulfoxide.

(C) *Cross-linking with ammonium persulphate (in higher concentration).*—The procedure of part B was repeated but employing 0.46 g. of ammonium persulfate. A similar result was obtained except that the cross-linked copolymer was somewhat discolored.

(D) *Cross-linking with potassium persulphate.*—The procedure of part B was repeated but substituting 0.27 g. of potassium persulphate for the ammonium persulphate. A similar result was obtained.

(E) *Effect of heat alone.*—A solution of 1 g. of the copolymer in 10 ml. of water heated on the steam bath for 30 minutes gave no change in viscosity and neither insolubilization nor gelation of the copolymer was observed.

(F) *Cross-linking with ammonium persulfate in dilute solution.*—A mixture of 0.540 g. of copolymer and 0.113 g. of ammonium persulfate in 100 ml. of water was heated at 70° C. and cross-linking followed by periodically taking the solution's viscosity. Initially, a small increase in viscosity was noted, and at 15 minutes rapid gelation of the system was observed. The results are summarized in the following table:

| Time, min.: | Inherent viscosity |
|---|---|
| 5 | 3.44 |
| 10 | 3.69 |
| 15 | Set to a gel. |

EXAMPLE II.—*Cross-linking of 1:20 N,N-dimethylacrylamide/acrylamide copolymer*

(A) *Preparation of copolymer.*—A mixture of 0.5 g. of N,N-dimethylacrylamide, 10 g. of acrylamide, and 0.02 g. of ammonium persulfate in 100 ml. of water was polymerized by the method described in Example I. Removal of water by evaporation at reduced pressure yielded a brittle polymer which possessed solubility characteristics similar to the 1:10 copolymer. Inherent viscosity of an 0.4% aqueous solution of this copolymer was 3.33 at 30° C. Analysis of the copolymer shows 19.4% nitrogen (calc. 19.5%). This copolymer was used in the experiments as described below.

(B) *Cross-linking.*—A mixture of 1.05 g. of the copolymer and 0.12 g. of ammonium persulfate in 10 ml. of water was heated at steam bath temperature for a half hour. Removal of water by evaporation at reduced pressure yielded a brittle polymer that was insoluble in water and in the polar solvents listed in Example I, part B.

(C) *Cross-linking.*—A solution of 0.828 g. of copolymer and 0.0911 g. of ammonium persulfate in 100 ml. of water was heated at 70° C. and cross-linking followed by periodically taking the viscosity of the solution. Initially the viscosity remained nearly constant, but after 20 minutes it increased slowly as the copolymer cross-linked. The results are summarized below:

| Time, min.: | Inherent viscosity |
|---|---|
| 5 | 2.12 |
| 20 | 2.19 |
| 25 | 2.21 |
| 40 | 2.24 |
| 60 | 2.45 |

EXAMPLE III.—*Attempted cross-linking of polyacrylamide*

(A) *Preparation of polymer.*—A solution of 10 g. of acrylamide and 0.02 g. of ammonium persulphate in 100 ml. of water was flushed with nitrogen, then heated at 60–70° C. for 30 minutes to yield a viscous solution. By evaporating the water at reduced pressure there was obtained a brittle polymer. It had an inherent viscosity of 3.31 at 30° C. (0.4% solution) and analysis showed 19.6% nitrogen (calc. 19.7%).

(B) *Attempted cross-linking.*—A mixture of 0.834 g. of the above polymer and 0.175 g. of ammonium persulfate in 100 ml. of water was heated at 70° C., and the viscosity of the solution measured periodically. Only degradation of the polymer was observed, as indicated by the following table:

| Time, min.: | Inherent viscosity |
|---|---|
| 5 | 2.12 |
| 10 | 1.92 |
| 20 | 1.63 |
| 30 | 1.42 |
| 60 | 1.09 |

EXAMPLE IV.—*Cross-linking of 1:10 N,N-dimethylacrylamide/acrylic acid copolymer*

(A) *Preparation of copolymer.*—A solution of 1 g. of N,N-dimethylacrylamide, 10 g. of acrylic acid, and 0.02 g. of ammonium persulphate in 100 ml. of water was polymerized by the method of Example I, part A. The copolymer slowly precipitated from solution on cooling to room temperature; by addition of acetone to the aqueous system it was completely precipitated. The hard, brittle copolymer had an inherent viscosity of 3.00 at 30° C. (0.4% aqueous solution) and was soluble in hot water and in the polar solvents listed in Example I, part A. Analysis indicated 1.39% nitrogen (calculated 0.96%).

(B) *Cross-linking.*—Heating of 1.1 g. of the copolymer and 0.23 g. of ammonium persulfate in 10 ml. of water at steam bath temperature for a half hour yielded a thick gel. Stirring of this gel with acetone yielded a hard mass which was insoluble in water and those polar organic solvents described in Example I, part B.

EXAMPLE V.—*Cross-linking of 1:1:10 N,N-dimethylacrylamide/acrylamide/acrylic acid terpolymer*

(A) *Preparation of terpolymer.*—N,N-dimethylacrylamide (1 g.), acrylamide (1 g.), acrylic acid (10 g.), and ammonium persulphate (0.02 g.) in 110 ml. of water were polymerized by the method of Example I, part A. The terpolymer partially precipitated from solution on standing; addition of acetone to the solution gave complete precipitation thereof. This polymer contained 2.56% nitrogen (calc. 2.56%) and was soluble in warm water and in the solvents listed in Example I, part A.

(B) *Cross-linking of terpolymer.*—To 1.2 g. of terpolymer in 11 ml. of water was added 0.23 g. of ammonium persulfate. The mixture cross-linked and set to a gel on heating at 85° C. for a half hour. The cross-linked polymer was isolated by addition of acetone to the gel. This polymer was insoluble in hot water and polar organic solvents, including those listed in Example I, part B.

EXAMPLE VI.—*Cross-linking of 1:10 N,N-dimethylacrylamide/ethyl acrylate copolymer*

(A) *Preparation of copolymer.*—A mixture of 1 g. of N,N-dimethylacrylamide, 10 g. of ethyl acrylate, 0.02 g. of ammonium persulphate in 300 ml. water were polymerized as in Example I, part A to yield a milky-white suspension. A rubbery copolymer was isolated by removal of water at reduced pressure. It was soluble in tetrahydrofuran and contained 1.2% nitrogen (calc. 1.3%).

(B) *Cross-linking of the copolymer.*—To 1.1 g. of copolymer ssupended in 30 ml. of water was added 0.23 g. of ammonium persulfate. The polymer immediately precipitated to the bottom of the reaction vessel on heating at steam bath temperature. The resulting rubbery material was insoluble in tetrahydrofuran.

EXAMPLE VII.—*Cross-linking of 1:10 N,N-dimethylacrylamide/acrylamide copolymer, using a redox system*

The copolymer described in Example I, part A was cross-linked using various redox systems as follows:

(A) To 4.35 g. of copolymer in 70 ml. of water was added 1.82 g. of ammonium persulfate and 0.17 g. of silver nitrate. On standing at room temperature for an hour, the polymer began to precipitate to the bottom of the reaction vessel, and the solution became less viscous. The resulting polymer was insoluble in water and the polar organic solvents listed in Example I, part B.

(B) When the above copolymer solution was heated at steam bath temperature, the cross-linking polymer started to precipitate after 5 minutes heating.

(C) To 4.35 g. of copolymer in 70 ml. of water was added 1.82 g. of ammonium persulfate and 0.83 g. of sodium bisulfite. On standing the solution at room temperature became more viscous and set to a gel after 2 hours time.

(D) When the above copolymer solution was heated at steam bath temperature the solution set to a gel after five minutes heating.

EXAMPLE VIII.—*Cross-linking of 1:1:10 N,N-dimethylacrylamide/acrylamide/acrylic acid terpolymer, using a redox system*

The terpolymer described in Example V, part A was cross-linked as follows:

(A) To 1.2 g. of terpolymer in 11 ml. of water was added 0.46 g. of ammonium persulfate and 0.10 g. of silver nitrate. The terpolymer began to cross-link immediately, and precipitated from solution. The resulting polymer was water insoluble and could not be dissolved in polar organic solvents.

(B) When 0.21 g. of sodium bisulfite was added to the above terpolymer solution in place of silver nitrate, the solution set to a thick gel. Mixing the gel with acetone yielded a hard mass which was insoluble in water and polar organic solvents.

Having thus described the invention, what is claimed is:

1. A process for preparing a cross-linked polymer which comprises heating at about 50–100° C. an aqueous composition containing:
   (I) A copolymer of:
      (A) A polymerizable ethylenically unsaturated monomer containing the N-methylcarbamyl radical

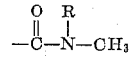

wherein R is a member of the group consisting of hydrogen and lower alkyl, and
      (B) a polymerizable ethylenically unsaturated monomer containing a radical selected from the group consisting of —CONH$_2$, —NH$_2$, —OH, —COOH, and esterified carboxyl, and
   (II) A water-soluble persulphate in the amount of at least one-tenth mole thereof per mole of N-methylcarbamyl radical in said copolymer.

2. The process of claim 1 wherein monomer A is N,N-dimethylacrylamide.

3. The process of claim 1 wherein monomer A is N,N-dimethylacrylamide and monomer B is acrylic acid.

4. The process of claim 1 wherein monomer A is N,N-dimethylacrylamide and monomer B is acrylamide.

5. The process of claim 1 wherein monomer A is N,N-dimethylacrylamide and monomer B is an alkyl acrylate.

6. The process of claim 1 wherein copolymer I is a copolymer of N,N-dimethylacrylamide, acrylamide, and acrylic acid.

7. A process for treating a fibrous material which comprises applying to the fibrous material an aqueous dispersion containing:
   (I) A copolymer of:
      (A) A polymerizable ethylenically unsaturated monomer containing the N-methylcarbamyl radical

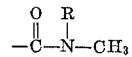

wherein R is a member of the group consisting of hydrogen and lower alkyl, and
      (B) a polymerizable ethylenically unsaturated monomer containing a radical selected from the group consisting of —CONH$_2$, —NH$_2$, —OH, —COOH, and esterified carboxyl, and
   (II) A water-soluble persulphate in the amount of at least one-tenth mole thereof per mole of N-methylcarbamyl radical in said copolymer, and heating the treated fibrous material at about 80–150° C. to cross-link the said copolymer in situ on the fibrous material.

8. The process of claim 7 wherein monomer A is N,N-dimethylacrylamide.

9. The process of claim 7 wherein monomer A is N,N-dimethylacrylamide and monomer B is acrylic acid.

10. The process of claim 7 wherein monomer A is N,N-dimethylacrylamide and monomer B is acrylamide.

11. The process of claim 7 wherein monomer A is N,N-dimethylacrylamide and monomer B is an alkyl acrylate.

12. The process of claim 7 wherein copolymer I is a copolymer of N,N-dimethylacrylamide, acrylamide, and acrylic acid.

13. The process of claim 7 wherein the fibrous material is wool.

14. An aqueous dispersion containing:
   (I) A copolymer of:
      (A) a polymerizable ethylenically unsaturated monomer containing the N-methylcarbamyl radical

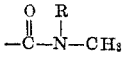

wherein R is a member of the group consisting of hydrogen and lower alkyl, and (B) a polymerizable ethylenically unsaturated monomer containing a radical selected from the group consisting of $-CONH_2$, $-NH_2$, $-OH$, $-COOH$, and esterified carboxyl, and (II) a water-soluble persulphate in the amount of at least one tenth mole thereof per mole of N-methylcarbamyl radical in said copolymer.

15. The composition of claim 14 wherein monomer A is N,N-dimethylacrylamide.

16. The composition of claim 14 wherein monomer A is N,N-dimethylacrylamide and monomer B is acrylic acid.

17. The composition of claim 14 wherein monomer A is N,N-dimethylacrylamide and monomer B is acrylamide.

18. The composition of claim 14 wherein monomer A is N,N-dimethylacrylamide and monomer B is an alkyl acrylate.

19. The composition of claim 14 wherein copolymer I is a copolymer of N,N-dimethylacrylamide, acrylamide, and acrylic acid.

References Cited by the Examiner

UNITED STATES PATENTS

| | | | |
|---|---|---|---|
| 3,082,178 | 3/1963 | Coover | 260—86.1 |
| 3,168,500 | 2/1965 | Suen et al. | 260—89.7 |

MURRAY TILLMAN, *Primary Examiner.*

W. J. BRIGGS, Sr., *Assistant Examiner.*